Figure 2:
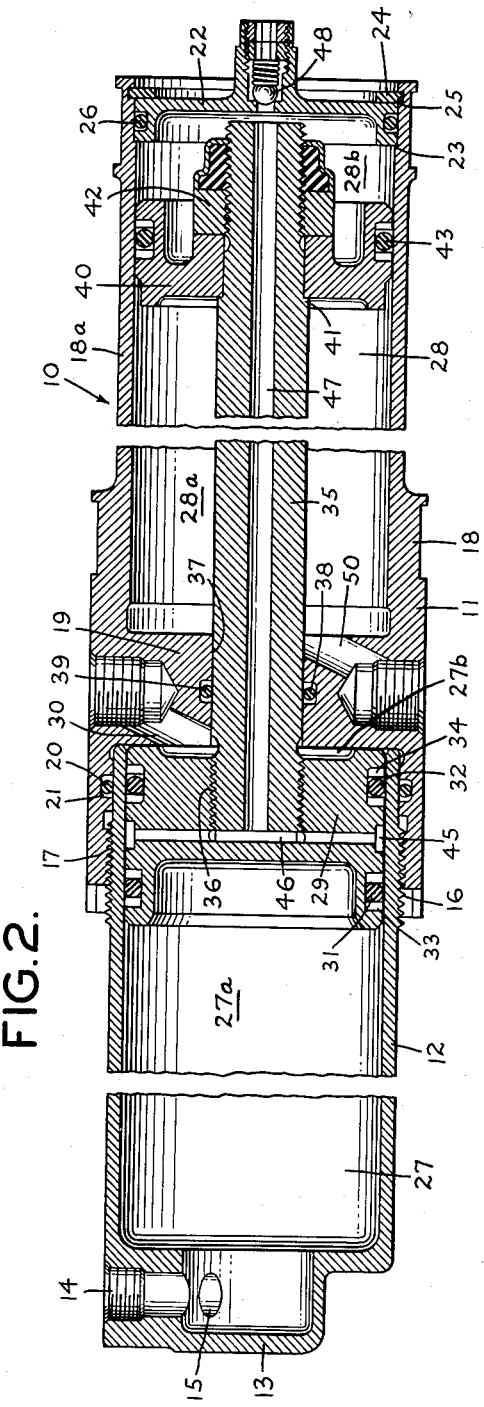

May 24, 1960  B. N. ASHTON ET AL  2,937,663
PISTON TYPE ACCUMULATOR
Filed May 12, 1958

INVENTOR.
BENJAMIN N. ASHTON
RAYMOND J. BARTEN
BY
HIS ATTORNEYS ns # United States Patent Office 2,937,663
Patented May 24, 1960

2,937,663

PISTON TYPE ACCUMULATOR

Benjamin N. Ashton and Raymond J. Barten, Kingston, N.Y., assignors to Electrol Incorporated, Kingston, N.Y., a corporation of Delaware Filed May 12, 1958, Ser. No. 734,705

5 Claims. (Cl. 138—31)

This invention relates to improvements in accumulators for hydraulic systems for aircraft and the like, and it relates particularly to an improved form of piston-type accumulator.

Accumulators of the piston type include a cylinder and a piston slidable in the cylinder serving as a movable partition for separating the hydraulic fluid from a gas under pressure by means of which a reserve of hydraulic pressure is maintained in the hydraulic system.

One of the problems involved in the production of a satisfactory piston-type accumulator is the prevention of leakage of hydraulic liquid and gas and the mixing of gas with the liquid in the hydraulic system. It is common, of course, to provide the pistons with piston rings of various types which serve with more or less success to prevent leakage of the gas or liquid.

We have proposed heretofore to maintain the space between the piston rings, particularly when the piston rings are of the O-ring type, at a substantially different pressure than the pressure in the hydraulic system to enhance the sealing action of the rings. Moreover, by venting the space to atmosphere, for example, the gas or hydraulic fluid leaking past the rings is discharged so that gas cannot enter the hydraulic system and hydraulic fluid cannot enter the gas chamber. When the space is vented, the liquid leaking by the rings is lost and and must be replaced from time to time to keep the system full. The escaping liquid, while small in quantity, also has a tendency to soil the accumulator and adjacent parts of the apparatus in which the hydraulic system is used and also to collect dust which not only renders the components of the system dirty but, in some instances, contributes to wear and deterioration of parts.

Accumulators embodying the present invention are constructed and arranged to overcome the deficiencies of the prior accumulators. More particularly, in accordance with the present invention, my new accumulator is constructed to enable gas or liquid to be vented from the apparatus in a convenient manner and at the same time to collect and return to the system hydraulic fluid which might tend to leak in quantity past relatively moving parts of the accumulator.

In a typical form of accumulator embodying the present invention, a hollow cylindrical body is formed which contains a centrally-located partition dividing it into a pair of chambers each of which has a piston slidably mounted thereto, these pistons being connected for movement in unison by means of a piston rod extending through the partition and in sealing engagement therewith. One of the chambers forms the accumulator in which gas under pressure is applied to one face of the piston therein, while the hydraulic pressure in the system is applied to the other face of the piston. Sealing or piston rings are mounted on the piston and the space between the rings is vented through a passage in the piston rod into the other or vent chamber of the accumulator on one side of the piston therein. The portion of the vent chamber into which the air is vented is in communication with the atmosphere so that the space between the piston rings on the piston in the accumulator chamber is maintained substantially at atmospheric pressure. The portion of the vent chamber between the piston therein and the partition is connected to the low pressure or return side of the hydraulic system so that any liquid leaking between the piston rod and the partition is returned to the hydraulic system.

Accumulators of the type described above are effective in maintaining the desired pressure reserve in the system, while preventing mixing of gas with the liquid of the hydraulic system in the accumulator and leakage or loss of liquid from the system.

Figure 1:
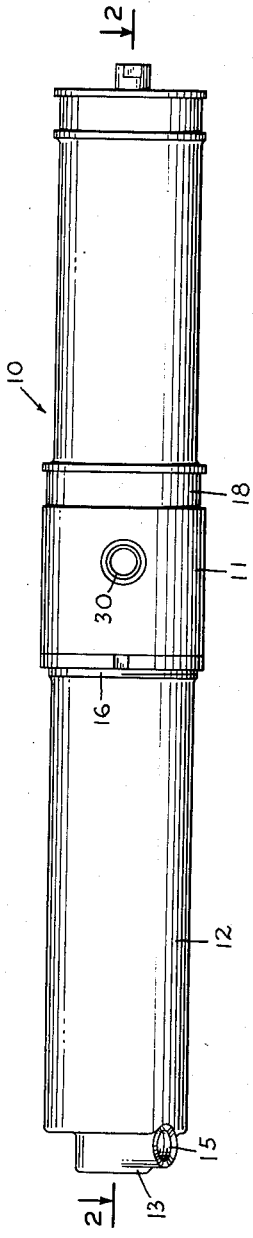

For a better understanding of the present invention, reference may be had to the accompanying drawing in which:

Figure 1 is a plan view of a typical accumulator embodying the present invention; and Figure 2 is a view in section taken on line 2—2 of Figure 1.

The form of accumulator 10 chosen for illustration includes a two-part cylinder member 11 which includes a hollow cylindrical section 12 having a closed end 13 provided with a pair of couplings or ports 14 and 15 which can be connected to suitable sources of gas under pressure. The opposite end of the cup-shaped section 12 is provided with a threaded portion 16 which is screwed into the internally threaded end 17 of a cylinder section 18 so that the end of the cylinder section 12 abuts against, or substantially against, a partition 19 spanning the cylinder section 18 between its ends. A sealing ring 20 is mounted in a groove 21 in the cylinder section 18 and engages the outer periphery of the cylinder section 12 to prevent leakage therebetween. A tubular extension 18a is also formed on the cylinder section 18 and has an open outer end which normally receives an end closure disc 22 which is retained against a shoulder 23 in the extension by means of a snap ring 24 releasably received in a groove 25 at the right-hand end of the extension 18a. An O-ring seal 26 is interposed between the end closure 22 and the extension 18a to prevent leakage therebetween.

The cylinder sections 12 and 18, the enclosures 13 and 22 and the partition 19 divide the cylinder 11 into an accumulator chamber 27 and a vent chamber 28. Mounted for reciprocation axially of the accumulator chamber is an accumulator piston 29 which serves to divide the accumulator chamber 27 into a gas-receiving chamber 27a to the left of the piston and a hydraulic-fluid receiving chamber 27b to the right of the piston, communicating with the pressure side of the hydraulic system through a port and passage 30 formed in the partition 19. Leakage of gas and liquid past the piston 29 is minimized by means of suitable piston rings, such as the O-rings 31 and 32 which are mounted in spaced relation in grooves 33 and 34 in the piston 29. A piston rod 35 is fixed to the piston 29 as by means of engaging threaded portions 36 thereon and extends in sliding relation through a central opening 37 in the partition 39. An O-ring seal 38 is carried by the partition 19 and engages the piston rod 35 to minimize leakage therebetween.

A second piston 40 is mounted in fixed relation on the right-hand end of the piston rod 35 and is retained against a shoulder 41 on the piston rod by means of a lock nut 42 threaded on the end of the piston rod. A piston ring 43 is carried by the piston for engagement with the wall of the tubular extension 18a, thereby dividing the vent chamber 28 into separate chambers 28a and 28b on opposite sides of the piston.

In order to maintain a substantial pressure differential on opposite sides of the piston rings 31 and 32 and thereby enhance their sealing action, a peripheral groove 45 is formed in the piston 29 between the piston rings 31 and 32 and a diametrical passage 46 connects the recess 45 with a bore 47 extending lengthwise of the piston rod and communicating at its right-hand end with the chamber 28b. In this way, the pressure between the rings 31 and 32 is the same as the pressure in the chamber 28b. Chamber 28b is maintained at a pressure only slightly higher than atmospheric pressure due to the presence of a relief valve such as, a ball check valve 48 in the end closure 22 which vents gas from the chamber 28b when the pressure of the gas substantially exceeds atmospheric pressure. The pressure in the chamber 28b may actually be less than atmospheric pressure under some conditions of operation due to the presence of the relief valve 48 so that a large pressure differential is maintained on opposite sides of each of the piston rings 31 and 32.

The chamber 28a in the cylinder portion 18 is connected by means of a passage and port 50 with the low pressure or return side of the hydraulic system so that this chamber likewise is at low pressure. Accordingly, a pressure differential is produced on opposite sides of the sealing ring 38 which reduces leakage past this ring to a minimum. Moreover, any liquid leaking past the ring 38 will be returned through the passage 50 to the hydraulic system.

It will be apparent that the arrangement of the components of the new accumulator is such as to preclude substantial leakage of gas or hydraulic fluid under pressure past the sealing rings, and even if such leakage should occur, hydraulic fluid will not be lost in any appreciable proportion from the system. Moreover, by discharging the gas from low pressure area between the piston rings 31 and 32 into a closed chamber and providing a relief valve such as the check valve 48 for relieving pressure in the chamber, but preventing inflow of air, little or no dust or dirt can be drawn into the accumulator from the outside atmosphere and abrasion and wear of the piston and cylinder are, accordingly, substantially reduced so that the operating life of the accumulator is greatly prolonged.

It will be understood that the accumulator is susceptible to considerable modification in its shape, arrangements and proportions and that various types of sealing or piston rings other than the O-ring type may be used. Accordingly, the form of the invention disclosed herein should be considered as illustrative and not as limiting the scope of the following claims.

We claim:

1. An accumulator comprising a cylinder having closed ends and a partition between its ends dividing it into first and second chambers, each having an inner and an outer end, a piston slidable lengthwise of each chamber, a piston rod fixed to both pistons and slidable in said partition in substantially fluid-tight relation thereto, first ports in said cylinder communicating with said first chamber on opposite sides of the piston therein for admitting fluids under pressure into said first chamber on opposite sides of the piston therein, the piston in said first chamber having piston rings in axially spaced relation thereon and a peripheral recess between said rings, a passage in said piston rod connected with said recess for venting fluid from said recess into the second chamber between the outer end of said second chamber and the piston therein, and second ports in said cylinder communicating with said second chamber adjacent to its inner and outer ends for discharging fluids from said second chamber on both sides of the piston therein.

2. The accumulator set forth in claim 1 comprising a relief valve in the second port communicating with the outer end of said second chamber.

3. The accumulator set forth in claim 1 in which said cylinder comprises a tubular member having open opposite ends, said partition being spaced from one end thereof, a removable end closure for the opposite end of said tubular member, and a cup-shaped member having a closed end and an open end, said cup-shaped member being in engagement with and forming an extension of said tubular member and having its open end adjacent to said partition.

4. The accumulator set forth in claim 3 in which said cup-shaped and tubular members are in detachable threaded engagement.

5. An accumulator comprising a cylinder having end closures at its opposite ends and a partition at about its midportion and forming a pair of cylinder chambers, a piston slidable in each of said chambers, a piston rod connecting said pistons and extending through said partition in substantially fluid-tight sliding engagement therewith, a pair of axially spaced piston rings on one of said pistons in one of said chambers, said one piston having a peripheral recess between said piston rings, a passage extending from said recess through said piston rod and the other piston and communicating with the other cylinder chamber between said other piston and the end closure of said other chamber, first ports in said cylinder communicating with said other chamber on opposite sides of said other piston for venting fluids from said other chamber, and other ports in said cylinder communicating with said one chamber on opposite sides of said piston for admitting fluids under pressure into said one chamber on opposite sides of said piston therein.

References Cited in the file of this patent

UNITED STATES PATENTS 2,790,462   Ashton _____ Apr. 30, 1957